Patented Mar. 28, 1939

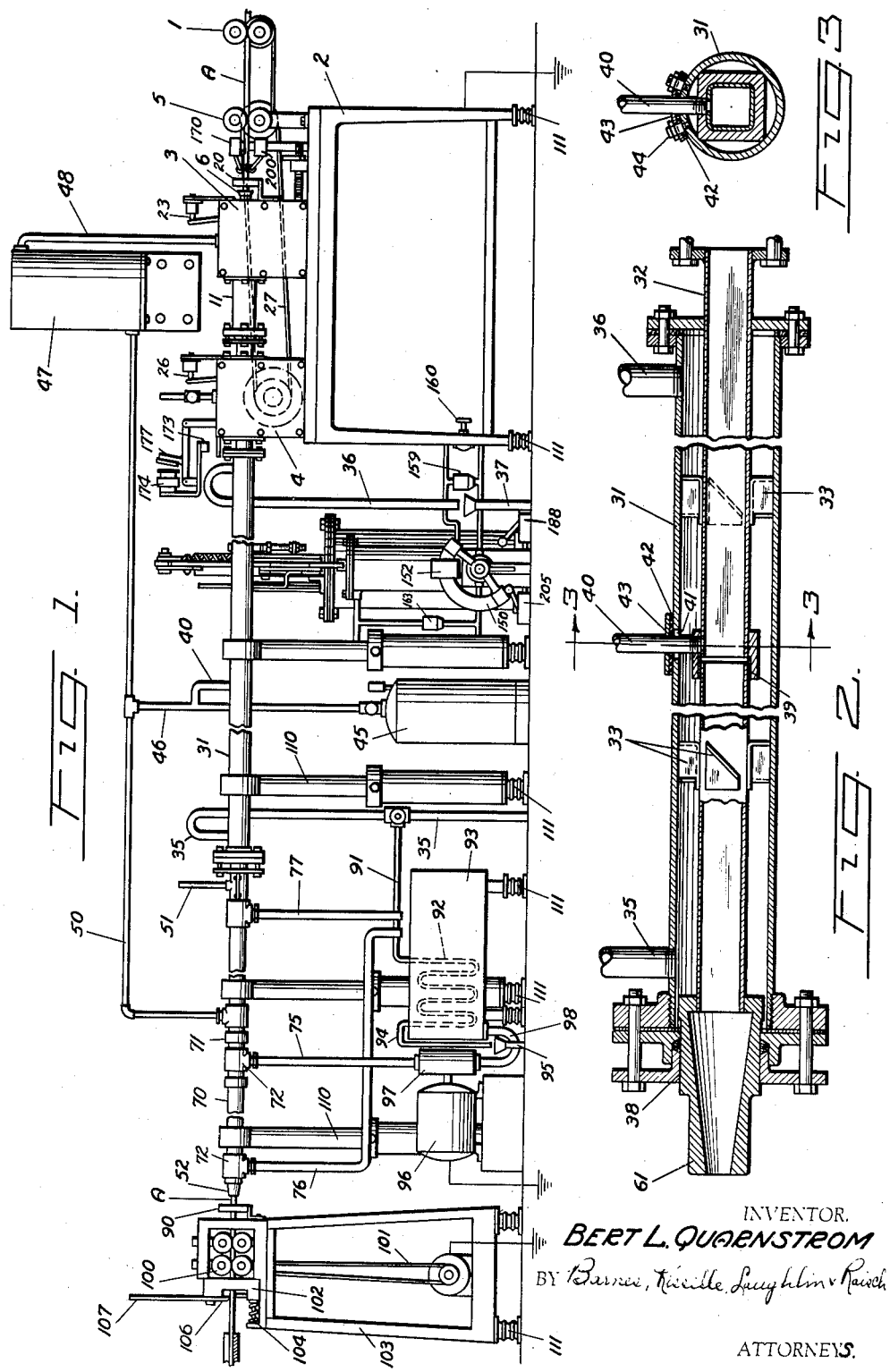

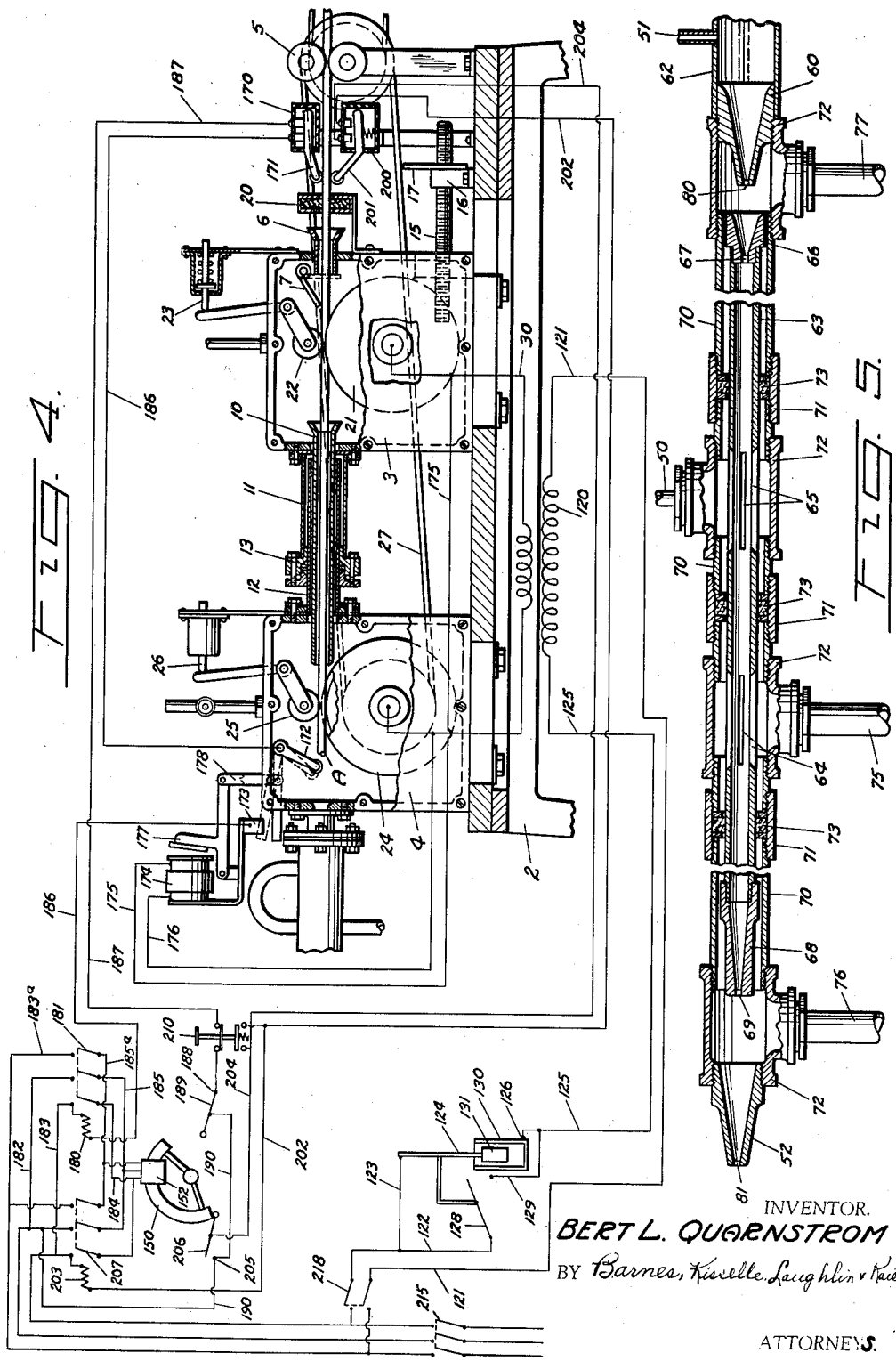

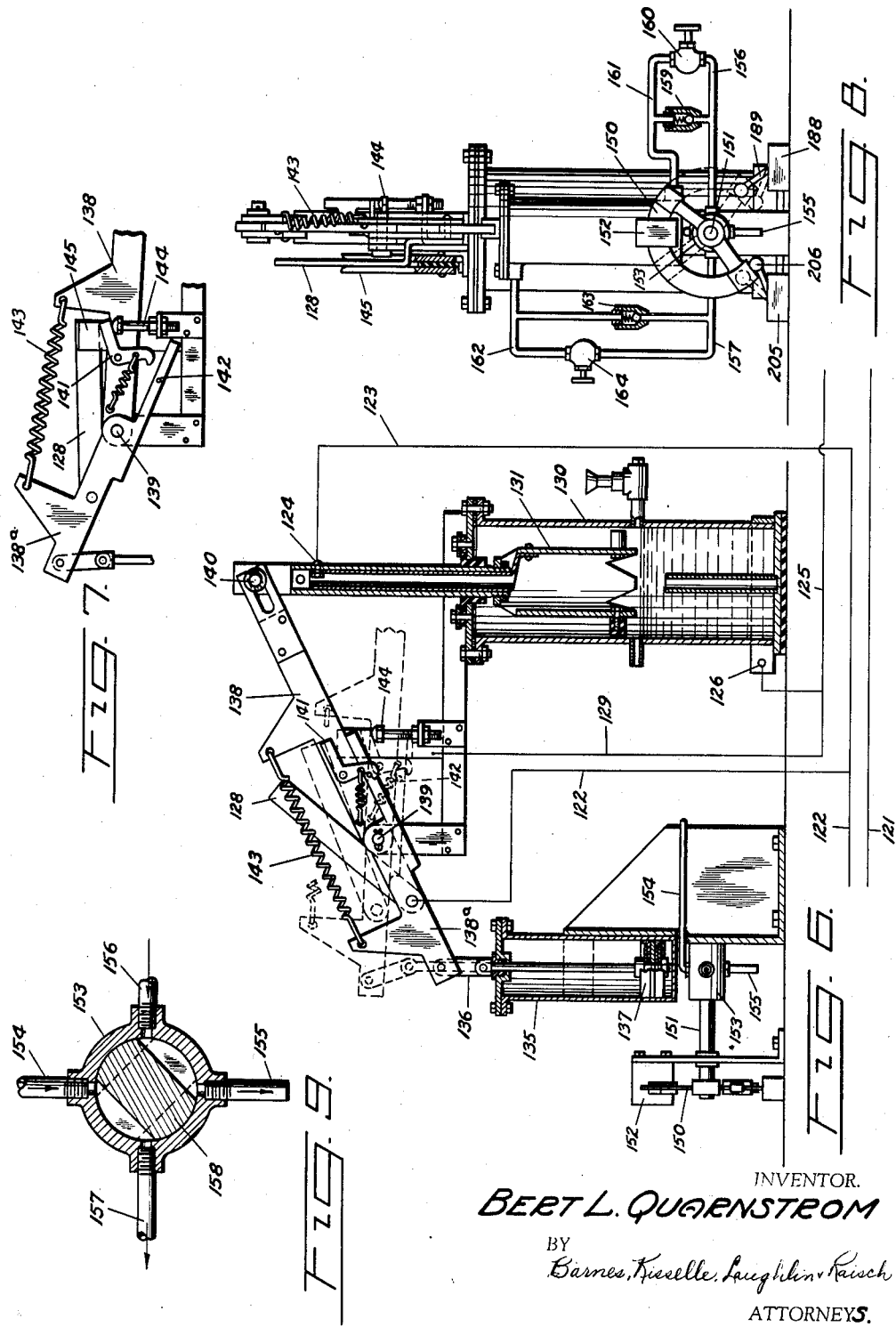

2,151,989

UNITED STATES PATENT OFFICE 2,151,989

APPARATUS FOR COPPER WELDING OR HEAT TREATING TUBING OR OTHER LONG LENGTHS OF METAL

Bert L. Quarnstrom, Detroit, Mich., assignor to Bundy Tubing Company, Detroit, Mich., a corporation of Michigan Application November 16, 1935, Serial No. 50,212

7 Claims. (Cl. 219—12)

This invention relates to an apparatus for heating by electrical resistance and then cooling, long lengths of material such as tube, rods, wire, or strip stock, or the like.

The apparatus is particularly useful in the manufacture of tubing which is fashioned from strip stock into tubular form and which, by means of the apparatus shown herein, is heated by electrical resistance so that overlapping or contacting surfaces of the stock are fused together. Specifically, a tube is referred to which has a seam or seams or overlapping parts or plies united by copper which has been rendered molten, and which may be made from copper coated strip stock. Such as the tube disclosed in the Harry W. Bundy Patent No. 1,930,191, of October 10, 1933. The basic metal of the strip may be ferrous metal or other metal, such as Monel, which has an affinity for copper.

In the making of such a copper coated tube the tube is fed quite fast through the apparatus and the electrodes are spaced longitudinally on the tube. One of the principal problems is that of cooling the tube down to a suitable temperature before it is exposed to the atmosphere. If the tube is exposed to the atmosphere after the molten copper has solidified but before the copper is sufficiently cooled, the same will rapidly oxidize, and the copper coating is rendered defective or destroyed. A cooling chamber of ordinary structure would have to be so long that it would be impractical to use the apparatus, where the tube moves at a relatively high rate of speed. Therefore, I have attacked the problem of providing a method and an apparatus therefor, which apparatus embodies a particular form of cooling device which includes a preliminary cooling of the tube and then a quenching of the tube, to the end that the total length of the cooling portion of the apparatus is materially reduced and the apparatus made practical for making tube at a high rate of speed.

While in the description herein reference is made to tubing, it is to be appreciated that the apparatus is not limited to the making of tubing. For example, the copper coating on a wire, rod, strip stock, or a coating on a sealed tube may be affixed to the underlying metal by heating the same, so that the copper alloys with the underlying metal. In this event a welding operation is not contemplated and the heats employed may or may not be above copper melting temperature. Nevertheless, the problem of cooling is present and the apparatus may be effectively used for treating such materials. Moreover, the apparatus may be used in annealing tube previously sealed with copper and which may be coated with copper. For example, in making small tube, a copper coated copper sealed tube may be made, and then drawn down to size. The drawn tube may then be run through the apparatus with the heat treatment arranged to anneal the steel, and the apparatus then meets the again present problem of cooling. These are the general objects of the invention, and others will appear as the detailed description progresses.

Fig. 1 is a side elevational view showing a structure embodying the invention.

Fig. 2 is an enlarged view largely in section showing part of the cooler of the device.

Fig. 3 is a cross sectional view taken on line 3—3 of Fig. 2.

Fig. 4 is an enlarged view with parts in section and with parts cut away illustrating the heating unit and electrical wiring system.

Fig. 5 is a detail view in cross section illustrating the quenching unit of the cooler.

Fig. 6 is a detail view largely in section showing the equipment used in the starting of the machine.

Fig. 7 is a detail view of some of the switch structure shown in Fig. 6, illustrating the switch in a different position.

Fig. 8 is a side elevational view of the apparatus shown in Fig. 6 looking from the left hand side thereof.

Fig. 9 is an enlarged sectional view of a controlling valve.

Referring to Fig. 1, the tube is shown at A and it moves from right to left between rollers 1. These rollers may be feeding rollers for feeding a definite length of tube, or the final rollers of a tube machine which fashions the tube from strip stock. Tube machines of this type run quite fast and the apparatus is designed to co-operate with such tube machines, so that the tube may be heated to melt the sealing metal and seal and complete the tube all in one operation. The electrodes may be supported on a table or the like 2, and the electrodes are housed in boxes or containers 3 and 4. The device may include another pair of driving rollers 5 and the tube may enter the box 3 through an inlet device 6. This inlet may be equipped with a swinging closure or door 7, which normally closes the inlet but which is automatically opened as a tube enters. The boxes 3 and 4 are connected by piping which houses the tube as shown in Fig. 4. The tube may run directly through a pipe 10 surrounded by telescoping pipes 11 and 12 joined by a slip joint or expansion joint 13. The boxes may be adjusted toward and away from each other to adjust the distance between the electrodes; to this end the box 3 may have a screw threaded rod 15 projecting therefrom which cooperates with the threaded nut (not shown) in housing 16, and which is turnable by a handle 17. Thus by turning the nut, the housing 3 may be fed along the support toward and away from the housing 4. Just prior to entry of the tube into the box 3 it may pass through a wiping device comprising suitable absorbent material 20 in a container, which absorbent material may contain an oil or other substance which when applied to the tube cracks in the subsequent heating step to deposit a film of carbon over the surfaces of the tube. This film of carbon serves to hold the copper coating in place on the surface of the tube, rod, wire, strip or other material while the copper is molten. This, however, is covered in Patents 2,092,018 and 2,092,557, both dated September 7, 1937.

Inside the box 3 is a roller electrode 21 which may be grooved to fit the tube, and the tube is held thereagainst by a spring pressed roller 22, the same being spring pressed by the structure shown, which includes the spring pressed plunger 23. The tube then passes through the pipe 10 and over a grooved roller electrode 24, and is likewise held thereagainst by a roller 25 held against the tube by a spring pressed plunger 26. The secondary circuit which carries a low voltage, high amperage current is connected to these rollers, the circuit being illustrated at 30. The roller electrode 24 is preferably driven, as by means of a belt 27 extending from the shaft of one of the driving rollers 5. Preferably, the arrangement is such that the surface speed of the roller 24 slightly exceeds that at which the tube moves. It will be seen, therefore, that the tube is heated by an electrical current passing lengthwise therethrough from one roller electrode to another, and the tube in its movement passes from the box 4 into the cooling sections of the apparatus.

There are certain electrical controls and circuits, as illustrated, and switches which are controlled by the presence or absence of the tube; but before going into a description of the electrical phase of the matter the remaining structure of the apparatus, and especially the cooling section, will be described.

A water jacketed unit of the cooler is connected in sealed relation to the box 4 and it comprises an outer jacket or pipe 31 and an inner pipe 32, with the inner pipe held spaced from the outer pipe by suitable spacer brackets 33. The inner pipe 32 may be joined directly to the box 4. A water supply main is illustrated at 35, and this may connect into the outer jacket at the left hand end or outgoing end thereof, as shown in Fig. 2. The water passes through the unit between the inner and outer jackets and may discharge therefrom near the entrance end through pipe 36, and the water may be drained off as waste through a drain pipe 37. Due to temperature changes, the inner and outer jackets are sealed together by means of an expansion joint 38, the details of which are shown in Fig. 2 and in connection with which a general reference is all that is necessary. Also, the inner jacket 32 is preferably divided for expansion and contraction, thus having a slip joint 39. Also, the apparatus is charged with a non-oxidizing or reducing gas such as hydrogen or a gas obtained by cracking ordinary illuminating gas, and generally called electrolene. A pipe 40 for such gas may be connected to the inner jacket 32 and extends out through a slot 41 in the outer jacket, which slot permits relative movement between the inner and outer jackets but which is sealed by a suitable gasket 42, held tight against the outer jacket by plate 43 which may be fastened to the outer jacket by screw threaded studs 44 and nuts, as shown.

A tank of such gas is shown at 45 and a pipe 46 leads therefrom to a dryer 47, and which dryer comprises a container of hygroscopic material, such as calcium chlorid, and the gas passes through the same and then enters the box 3 through a pipe 48. Thus dry gas is passed into the chamber of highest temperature, thus minimizing the possibility of the collection of moisture. Pipe 46 connects into a pipe 50, which in turn leads into substantially the central portion of the quenching unit of the cooler. Also, pipe 40 connects to pipe 46, so that the gas is passed into the box 3, into the water cooler section of the cooler, and into the quenching section. Most of the gases pass toward the left with the movement of the tube and burn off at burn off pipe 51, while some of the gases may burn off at the extreme outlet end of the cooler section, as shown at 52 (Figs. 1 and 5).

The quenching section is illustrated in Fig. 5, and its entrance end has an extension 60 which is connected to the extension 61 on the outgoing end of the water cooled jacket, by a sleeve 62. This quenching section comprises an inner pipe 63, provided with openings in the form of longitudinal slots 64 and 65. This pipe is equipped with an inlet device 66 for the tube, which substantially plugs the inlet end but has a relatively small port 67 which fairly snugly fits the tube. The outlet end of the pipe is provided with a fitting 68 which has a relatively small tube aperture 69. The outer jacket of the quenching device is advantageously composed of pipe sections and fittings in the nature of couplings and T's. Such pipe sections are shown at 70, the couplings at 71, and the T fittings at 72. The couplings are associated with a structure providing sealing joints as at 73, which substantially seal the space between the outer and inner jackets. A suitable liquid, such as oil, is forced into this quenching unit through a pipe 75 which is connected to one of the T fittings and the same discharges therefrom through pipes 76 and 77 connected to T fittings at opposite ends of the quenching unit. The pipe 50 for the non-oxidizing gas connects into the fourth T fitting, as shown.

A tube moves through the unit as shown in Fig. 5 from right to left, and to facilitate initial insertion of the tube therethrough the member 60 is of internal tapered form to guide the tube to an aperture 80 which closely fits the tube. The member 60 may be similarly tapered, and preferably the fitting 68 and outlet member 52 are similarly tapered, the outlet member 52 having a relatively small aperture 81, which fairly snugly fits the tube. It will be noted that the members 60 and 66 fit into opposite ends of the T fitting at the entrance end of the unit, and the fitting 68 and outlet member 52 connect into opposite ends of the T fitting at the outlet end of the unit. The result is that when a tube is in the unit the several small apertures are substantially closed.

While on the subject of this quenching unit, it is thought best to describe the operation and function thereof before going into the description of other structure. Therefore, assuming that a tube is moving through the device, as shown in Fig. 5, from right to left, and that oil under pressure is being forced through the pipe 75; this oil is trapped, so to speak, between the sealing joints 73. Therefore, the oil is forced through the apertures 64 into direct contact with the tube. The oil moves in opposite directions, some through the device toward the left into the outlet pipe 76 and some toward the right to the outlet pipe 77. The small aperture 80 substantially prevents any oil from passing into the water jacketed unit. This action is aided by movement of the tube through the aperture 80. The outlet aperture 81 substantially prevents oil from leaking out of the outlet end, although there may be some leakage at this point, due to the movement of the tube, but it does not disturb the operation in any way. The tube may run through a wiper device 90 (Fig. 1) for wiping off excess oil. Thus the tube is completely surrounded by the quenching oil. At the same time a non-oxidizing condition is caused to prevail because the gases which enter through the pipe 50 are caused by said sealing joints to pass into the pipe 63 through the apertures 65, and this gas may burn off at the burn off pipe 51 or the outlet end 81, or both.

By reference to Figure 1 the manner in which the oil is cooled will be appreciated. A suitable supply of water from the main 35 is directed through a pipe 91 which then extends through coils 92 in a reservoir tank 93, the water discharging through pipe 94 and drain 95. A suitable motor 96 drives a pump 97, which pumps the oil from the reservoir through a pipe 98, thence up through the pipe 75 to the quenching unit, and the oil returns to the reservoir through the aforementioned pipes 76 and 77.

As the tube passes out of the device it may pass between a set of rollers 100, some or all of which may be driven as by means of a belt 101, preferably at a speed slightly in excess of that of tube movement. A cut off device may be used for cutting the tube into lengths where it is fed into the machine in a substantially continuous length, as for example, where tube is formed of strip stock. A simple form of cut off device is shown which may comprise a block 102 slidably mounted on a support 103 and acted upon by a coil spring 104 and carrying knives 106 operated by a manually operated lever 107. When the operator rocks the lever the knives cut the tube, and momentarily the block 102 is carried along with the tube. The operator releases the lever quickly and the block then moves back to its original position, as shown.

The cooling device, therefore, as will be observed, comprises in the main, a tubular structure, a section of which is water jacketed, and a section of which is a quenching unit. This tubular structure may be mounted on suitable supports 110, which, together with other portions of the machine, are preferably mounted on electrical insulators 111, as shown. The primary coil of the welding transformer is shown at 120, one end of which connects directly to the lead line 121. The other lead line 122 has a line 123 which connects to one pole 124 of a starter or starting switch, and line 125 connects to the other pole thereof, as shown at 126. Lead 122 connects to a cut out switch 128, which shunts out the starter and which, through a lead 129, connects directly into the line 125. This is diagrammatically shown in Fig. 4. One form of a starting switch and associated apparatus is shown in Fig. 6 where the starter comprises a tank 130 which may contain a suitable electrical conducting fluid and a plunger 131. This plunger moves downwardly and the area of contact of the fluid and the plunger gradually increases, thus increasing current flow, until the plunger is at the bottom of the container. At this time, however, the current is shunted around the starter by a knife switch 128. The plunger is advantageously operated by compressed air, for which purpose there is a cylinder 135 with a piston 137 therein. The piston rod is connected by a link 136 to a jointed lever 138, 138a fulcrumed at 139 and connected to the plunger at 140. As shown in Fig. 7 the jointed arm comprises a part 138a normally latched to part 138 by a spring actuated hook 141, which catches on a pin 142. This is the position shown in Fig. 6. The two parts are tensioned by a coil spring 143. As the piston moves upwardly the plunger is forced downwardly in the container until it is in its lowermost position therein at about which time the heel of the hook 141 strikes an abutment 144 and is rocked to release the pin 142, whereupon continued movement of the piston rocks 138a independently of movement of the part 138. The dotted line showing in Fig. 6 illustrates approximately the position of the parts at the time when the hook 141 is released from the pin. At this time the blade of the knife switch 128 is out of contact with its contact member 145, and upon continued upward movement of the piston part 138a is rocked and the knife switch closed, and thus the current is shunted across the knife switch to line 129 and line 125. Due to this arrangement, at the start of the operation the welding current is relatively low, but it gradually increases as the plunger moves down into the receptacle. This is but one form of such a starting device. It will be understood that when the piston is caused to move downwardly the parts 138 and 138a of the lever again assume their interlocked relation.

A controlling valve for the compressed air may be operated by a reciprocating or oscillating electric motor. The structures of such electric motors are well known, and suffice it to say herein that it may have a reciprocating armature 150 pivotally mounted on a rock shaft 151 and has a stator 152. The shaft extends into a valve housing 153, into which connects an air supply line 154, an exhaust 155, an outlet 156 and an outlet 157, and in which is a valve member 158. Line 156 (Fig. 8) is connected through the means of a check valve 159 and another valve, which may be an ordinary hand controlled valve 160, to a pipe 161, which leads to the bottom of the cylinder. Pipe 157 connects to a pipe 162, leading to the top of the cylinder, such connection being through a check valve 163 and a valve 164 similar to valve 160. With the parts in the position shown in Figures 8 and 9 the compressed air is sent into the top of the cylinder through the check valve 163, and some of which may pass through the valve 164. The air previously trapped in the lower part of the cylinder below the piston is caused to exhaust therefrom through the valve 160, the exhaust being out the pipe 155. The speed of movement of the piston may therefore be controlled by adjusting the valve 160. When the motor armature shifts to the dotted line position shown in Fig. 8 the situation is reversed. The air passes to the bottom of the cylinder and out the top of the cylinder through valve 164, and adjustment of this valve may control the speed. Accordingly, the valve 164, for example, may be adjusted for a slow upward movement of the piston, thus causing a slow movement of the starting plunger down into the container, and the valve 160 may be adjusted for a quick lift upwardly of the plunger.

Superimposed on Fig. 4 is a wiring diagram. The device is equipped with a normally open pilot switch 170 having an arm 171 equipped with a roller which the tube engages and raises as the tube enters the machine to close the switch. It has another normally open pilot switch 173 with an arm 172 which is engaged by and raised by the tube to close the same. In connection with this pilot switch there is a solenoid 174 in circuit with the welding circuit by means of conductors 175 and 176. So long as the welding circuit is energized the solenoid is energized and it attracts an armature 177, which is connected by a link 178 to the pilot switch 173. It will be appreciated that the tube is hot at the location of the arm 172 of the second pilot switch; therefore, the solenoid is provided to lift the arm 172 off the tube during machine operation. These two switches are connected in series in a circuit off of the main power line and in series with a solenoid 180, which when energized, closes a switch 181 for the stator. This structure constitutes a relay. Conductors 182, 183 and 183a are connected by the switch to conductors 184, 185 and 185a leading to the stator. The circuit for the pilot switch resides in a conductor 186 connecting to solenoid 180 and a conductor 187, which extends to a switch 188 opened and closed by the motor through the means of a rocker arm or the like 189; from the switch 188 a conductor 190 extends to the opposite side of the power line, as shown.

Adjacent the pilot switch 170 is a second pilot switch 200, which is normally closed, and which has an arm 201 to be engaged by the tube to open the switch. A conductor 202 connects this switch to one side of the power line through the solenoid 203 for acting upon a switch 207. This constitutes a relay. A second conductor 204 connects to the conductor 190 through the means of a switch 205 which is opened and closed by a rocker arm or the like 206 actuated by the armature of the motor.

The operation is as follows: As a tube enters the machine the switch pilot 200 is opened; the pilot switch 170 is closed; however, the closing of pilot switch 170 has no effect until the end of the tube advances far enough to close the switch 173. At this time the motor and the arms 189 and 206 are in the position shown in Figs. 4 and 8; therefore, the switch 188 is closed, and as a result the solenoid 180 is energized. The action of this solenoid closes the switch 181 and the stator is energized, causing the armature to move to the dotted line position of Fig. 8, to shift the valve 158 to connect the compressed air line to the bottom of the cylinder and to connect the top of the cylinder to the exhaust. And thus the plunger of the starting switch is moved downwardly into the liquid and the current gradually increases. Finally, when the plunger approaches the bottom of the container the double arm 138—138a will break and the switch 128 will then close and shunt out the starter switch. The welding circuit being energized also causes energization of the solenoid 174 so that the arm 172 is lifted from the hot tube. This is to prevent any damage to the tube surface, especially where the copper or other surface metal is rendered molten. In this action the motor armature swings clockwise, strikes the arm 189 and opens switch 188, thus deenergizing the solenoid 180, and the switch 181 will open. As the armature moves off of the arm 206, the switch 205 closes, but the circuit for the solenoid 203 still remains open because the pilot switch 200 is held open by the tube. This condition maintains as long as tubing is being run through the machine.

When the end of the tube runs off the switch member 201, switch 200 closes. Thus the solenoid 203 is energized and the switch 207 is closed and the motor stator energized. This time the oscillating motor rocks in the opposite direction, thus reversing the air valve, causing the starter plunger 131 to be lifted out of the liquid to break the welding circuit. Eventually, the armature rocks the arm 206 and opens the switch 205 with the result that the solenoid 203 is deenergized and switch 207 opens and the controlling circuit is dead. When the armature moved counter-clockwise by reason of the closing of the switch 200, it will be understood that the arm 189 is released and the switch 188 closes. Therefore, the controlling circuit and switch positions are restored to their initial condition.

Briefly reiterating the operation, it will be noted that so long as there is no tubing or other element, which may be a wire, rod or strip, in the machine, the circuit for the oscillating motor, and the controlling circuits containing the pilot switches are dead; that the welding circuit is dead by reason of the position of the plunger of the starting switch. As soon as the tube enters the machine the reciprocating motor actuates to reverse the air valve and after such reversal the controlling circuits again become dead by reason of the opening of the switch 188. The reversing of the air valve causes the plunger of the starting switch to move into the liquid and the welding circuit is energized. As the end of the tube leaves the machine some of the controlling circuits are energized, the reciprocating motor operated in reverse direction to reverse the valve, the starting plunger lifts to break the welding circuit, and at the end of the oscillating movement of the armature, the controlling circuits are again deenergized by the opening of the switch 205.

There is an emergency switch 210 designed to be placed at a convenient location to be actuated by a machine attendant any time the machine is operating to bring it to a stop. When this switch is actuated it completes the circuit for the solenoid 203, and in fact shunts the current short of the switch 200. Thus the oscillating motor is reversed and it moves from the dotted line position shown in Figure 8 to the full line position, and when it reaches the end of its movement the switch 205 is opened and the current for the solenoid 203 broken. The switch 210 also has a contact member in circuit with the pilot switches 170 and 173, so that the circuit for the solenoid 180 is broken. Therefore, it will be noted that upon actuation of the switch 210 the welding circuit is cut off the same as it is upon actuation of the switch 200; but as soon as the armature leaves the rocker arm 189 the switch 188 closes and due to the fact that the tube is in the machine the circuit for the solenoid 180 would be energized. However, this circuit is not energized until the switch 210 is again operated or released by an attendant to close the circuit for the solenoid 180, at which time the reciprocating motor is energized and moves from off position to on position, or in other words from the full line position to the dotted line position shown in Figure 8. The main line may have a main controlling switch 215 and the welding line may have a switch 218. Such oscillating motors are available on the market and contain their own controlling mechanism and need not be detailed herein, and such mechanism forms no part of the invention, except that the motor, broadly, is an element in the combination of the entire apparatus.

An example of the operating conditions of the apparatus may be given with respect to the making of tubing fashioned from copper coated steel stock. The tube referred to in this particular example is of the type shown in my Patent No. 1,933,279 of October 31, 1933. The steel stock was copper coated by an electro-plating process and then fashioned into tubing. This tubing was then moved through the apparatus. The temperature attained by the electrical resistance exceeded copper melting temperature, with the result that the copper was made molten and the tube seam copper welded upon the cooling of the copper. The provision of the non-oxidizing and reducing gas prevented oxidation, and the resultant tube was copper coated. Tube was moved through the machine at the rate of about 45 feet per minute. The tube was ½ inch in outside diameter, and had a wall thickness of .035. The rate of movement and metal mass, of course, is to be co-ordinated with the cooling section. In this particular instance, the water jacket was about 20 or 25 feet long and the oil bath or quenching unit was about 4 feet long. These dimensions, of course, may be increased where there is a greater metal mass or greater speed of movement, without departing from the invention. The water jacketed cooling unit brought the temperature of the tube down to somewhere around 700° F. from the copper melting temperature of about 1983° F. It would be impracticable to expose the copper coated tube to the atmosphere at a temperature as high as 700° F., as there would be a rapid oxidization of the copper. Likewise it is impractical to have a cooler, say for example a water jacketed cooler, to do all the cooling, as at these temperatures and speed the cooler section would have to be so long as to make the device impractical. The rate of cooling decelerated with temperature decrease with the result that a cooler of great length would be required to cool the tube from say 700° F. to 200° F. Therefore, I have employed the quenching unit. The tube entered the quenching unit at about 700° F. and then was discharged therefrom and exposed to the atmosphere at a temperature of about 200° F., which is below the oxidizing temperature of the copper coated tube. These figures and dimensions are given as an example only, it being understood that the invention is not limited thereto.

The device is equally usable to anneal previously copper coated and copper welded tube, in which event the heat created by the resistance will be less than that of copper melting temperature. The same problem exists where such tube, being annealed, is copper coated because it must not be exposed to the atmosphere at high temperatures; and therefore the apparatus, including the water jacketed cooler unit and quenching unit, may be used in annealing such tube. Moreover, the apparatus may likewise be used in affixing by heat the copper coating on tube rods, strip stock, wire, or the like. In this regard tube or other lengths of material may be made of a basic metal other than steel, so long as the basic metal has an affinity for the copper. A good example of this is Monel. Also the invention is not limited to use with copper coated or copper welded lengths, as the same may be used with other metals where a cooling action is desired.

I claim:

1. In an apparatus for heating by electrical resistance a longitudinally moving relatively long length of metal comprising, longitudinally spaced electrodes, a closure for each electrode, a tubular structure connecting the closures through which the strip of metal extends and including telescoping tubular members with a sealing slip joint, and means for adjusting one of the closure members with its electrode therein toward and away from the other closure member to vary the spacing between the electrodes.

2. In an apparatus substantially for the purposes described, means for passing a long length of metal lengthwise, spaced electrodes for engaging the metal at longitudinally spaced points, whereby the section of metal therebetween is heated by electrical resistance, an electrical circuit for the electrodes, a switch for said circuit, means for actuating said switch, a controlling circuit, two pilot switches in series in the controlling circuit, each having an element engageable by the length of metal and movable thereby to close the same, with one element adjacent one electrode and one adjacent the other electrode, and means operable upon the closing of said controlling circuit by said pilot switches which results in an actuation of the switch actuating means to close the electrical circuit.

3. In an apparatus substantially for the purposes described, means for passing a long length of metal lengthwise, first and second spaced electrodes for engaging the metal in the order named at longitudinally spaced points, whereby the section of metal therebetween is heated by electrical resistance, an electrical circuit for the electrodes, a switch for said circuit, means for actuating said switch, a controlling circuit, two pilot switches in series in said circuit, one adjacent the first electrode and one adjacent the second electrode and each having an element engageable and movable by the length of metal to close said switches, whereby the controlling circuit is closed when the entering end of the length of metal reaches the pilot switch electrode adjacent the second and is opened as the rear end of the length of metal passes the pilot switch adjacent the first electrode, and means operable upon the closing of the pilot switches and upon the opening of the first pilot switch, which results in an actuation of the said means for actuating the switch for the electrode circuit.

4. In an apparatus substantially for the purposes described, means for passing a long length of metal lengthwise, first and second spaced electrodes for engaging the metal in the order named at longitudinally spaced points, whereby the section of metal therebetween is heated by electrical resistance, an electrical circuit for the electrodes, a controlling switch therefor, means for actuating the switch, a controlling circuit having a pair of pilot switches connected in series therein, both of which are normally open and each of which is closed by engagement with the length of metal in the apparatus, one switch being adjacent the first electrode and one adjacent the second electrode, a relay in the controlling circuit operable upon the closing of both pilot switches, the operation of which results in the actuation of the said switch actuating means for closing the switch for the electrode circuit, means for opening the controlling circuit while the said pilot switches remain closed, a second controlling circuit having a normally closed pilot switch held open by the presence of the length of metal, said second controlling circuit being closed by said last named pilot switch when the rear end of the length of metal arrives, a relay operated by the closing of the second controlled circuit, which results in the actuation of said switch actuating means for opening the electrode circuit, and means for opening said second controlling circuit subsequent to the closing thereof by the last mentioned pilot switch.

5. In an apparatus substantially for the purposes described, means for passing a long length of metal lengthwise, first and second spaced electrodes for engaging the metal in the order named at longitudinally spaced points, whereby the section of metal therebetween is heated by electrical resistance, an electrical circuit for the electrodes, a switch for making and breaking said circuit, a reciprocating control motor, a controlling circuit having a pair of normally open pilot switches connected in series, one adjacent the first electrode and one adjacent the second electrode, and both of which are closed by the presence of the length of metal in the apparatus, a relay in the controlling circuit including a switch for the reciprocating motor, whereby the reciprocating motor is actuated as the said controlling circuit is closed by the two pilot switches, another switch in said controlling circuit opened by the reciprocating motor substantially at one end of its said reciprocable movement, a second controlling circuit having a normally closed pilot switch held open by the presence of the length of metal and which closes as the end of said length of metal passes thereby, a relay in said second controlling circuit including a switch for the reciprocating motor whereby the motor moves in a reverse direction, another switch in the second controlling circuit opened by the reciprocating motor substantially at the end of its second reciprocable movement, and means operated by the reciprocating motor to throw the switch for the electrode circuit on and off.

6. In an apparatus substantially for the purposes described, means for passing a long length of metal lengthwise, first and second spaced electrodes for engaging the metal in the order named at longitudinally spaced points, whereby the section of metal therebetween is heated by electrical resistance, an electrical circuit for the electrodes, a switch for making and breaking said circuit, a reciprocating control motor, a controlling circuit having a pair of normally open pilot switches connected in series, one adjacent the first electrode and one adjacent the second electrode, and both of which are closed by the presence of the length of metal in the apparatus, a relay in the controlling circuit including a switch for the reciprocating motor, whereby the reciprocating motor is actuated as the said controlling circuit is closed by the two pilot switches, another switch in said controlling circuit opened by the reciprocating motor substantially at one end of its said reciprocable movement, a second controlling circuit having a normally closed pilot switch held open by the presence of the length of metal and which closes as the end of said length of metal passes thereby, a relay in said second controlling circuit including a switch for the reciprocating motor whereby the motor moves in a reverse direction, another switch in the second controlling circuit opened by the reciprocating motor substantially at the end of its second reciprocable movement, means operated by the reciprocating motor to throw the switch for the electrode circuit on and off, and an emergency switch for manual operation connected in the second controlling circuit in parallel with the last mentioned pilot switch and having a switch member for breaking the first mentioned controlling circuit as the second controlling circuit is closed.

7. In an apparatus substantially for the purposes described comprising, means for passing a long length of metal lengthwise, first and second spaced electrodes for engaging the length of metal at longitudinally spaced points in the order named, whereby the metal therebetween is heated by electrical resistance, electrical control means including a pilot switch adjacent the first electrode and a pilot switch adjacent the second electrode, and which are connected in a controlling circuit for energizing a circuit for the electrodes, said pilot switches each having an arm engageable by and movable by the length of metal when the same is in the apparatus to close said pilot switches, a solenoid connected across the electrode circuit, and an armature attracted thereby and connected to the pilot switch adjacent the second electrode to lift the arm of said switch off the metal which has been heated by electrical resistance.

BERT L. QUARNSTROM.